(12) United States Patent
Trossen et al.

(10) Patent No.: US 7,293,271 B2
(45) Date of Patent: Nov. 6, 2007

(54) SYSTEMS AND METHODS FOR EVENT SEMANTIC BINDING IN NETWORKS

(75) Inventors: Dirk Trossen, Cambridge, MA (US); Dana Pavel, Cambridge, MA (US)

(73) Assignee: Nokia Corporation, Espoo (FI)

( * ) Notice: Subject to any disclaimer, the term of this patent is extended or adjusted under 35 U.S.C. 154(b) by 863 days.

(21) Appl. No.: 10/465,455

(22) Filed: Jun. 19, 2003

(65) Prior Publication Data

US 2004/0260749 A1 Dec. 23, 2004

(51) Int. Cl.
*G06F 3/00* (2006.01)
*G06F 15/173* (2006.01)

(52) U.S. Cl. ...................... 719/318; 709/224
(58) Field of Classification Search .......... 719/318, 719/331, 332; 709/224
See application file for complete search history.

(56) References Cited

OTHER PUBLICATIONS

E. Mena, V. Kashyap, A. Seth, A. Illarramendi; *Observer: An Approach for Query Processing in Global Information Systems based on Interoperation Across Pre-Existing Onthologies*; Cooperative Information Systems; Proceedings, First IFCIS International Conference on Brussels, Belgium; Jun. 1996; pp. 14-25; XP010200745; ISBN 0-8186-7505-5.
J. Rosenberg; *A Session Initiation Protocol (SIP)Event Package for Registrations*; Internet Engineering Task Force Internet Draft; May 2002; 23 pages; XP002228499.
A. B. Roach; *RFC 3265: Session Initiation Protocol (SIP)—Specific Event Notification*; Network Working Group Request for Comments; Jun. 2002, pp. 1-38; XP002280672.
J. Rosenberg; *A Presence Event Package for the Session Initiation Protocol (SIP)*; Internet Engineering Task Force Internet Draft; Jan. 2003; pp. 1-24; XP002962685.
Construction Specialties, Inc., C/S Suncontrols 2003 catalogue, copyright 2002, printed in U.S.A., 12 pages.
Construction Specialties, Inc., C/S Daylight Management Systems handout, undated, Cranford, N.J., 2 pages.
J. Rosenberg; *A Watcher Information Event Template-Package for the Session Initiation Protocol (SIP)*; Jan. 2003; 19 pages; Available at <http://www.ietf.org/internet-drafts/draft-ietf-simple-winfo-package-05.txt> (visited May 4, 2003).
S. Olson; *Requirements for Content Indirection in Session Initiation Protocol (SIP) Messages*; Feb. 2003; 10 pages; Available at <http://www.ietf.org/internet-drafts/draft-ietf-sipping-content-indirect-03.txt> (visited May 4, 2003).

*Primary Examiner*—Krisna Lim
(74) *Attorney, Agent, or Firm*—Alston & Bird LLP

(57) ABSTRACT

A system and method are provided for binding a semantic to an event. The system includes a first network entity capable of transmitting a subscription message including an event package and a semantic description describing a semantic associated with the event package. The system also includes an event server capable of receiving the subscription message. The event server is thereafter capable of generating a semantic package identifier associated with the event package and the semantic description to thereby bind the event package to the semantic description. The event server is further capable of sending a first notify message to the first network entity, where the first notify message includes the semantic package identifier.

21 Claims, 5 Drawing Sheets

SYSTEMS AND METHODS FOR EVENT SEMANTIC BINDING IN NETWORKS

FIELD OF THE INVENTION

The present invention relates generally to telecommunications networks and, more particularly, relates to systems and methods for event semantic binding in networks.

BACKGROUND OF THE INVENTION

Event subscription and notification in network environments is becoming increasingly commonplace and important. Event subscription generally allows a first network entity to subscribe to event notifications from a second entity. Common examples of events include "presence" and "location;" however, the number and types of events are endless. For instance, conventional instant messaging services permit a first user to subscribe to a presence event for a second user. As such, during the period of the subscription, the first user receives updates as to the presence status (e.g., online or offline) of the second user. The subscription may be for a single inquiry, which will return a response of "present" or "not present" for the second user. The subscription may also be for a set period of time, which may result in multiple updates, or for other options (e.g., status change notifications, ongoing notifications, etc.)

Various protocols may be used for event subscription and notification. For example, the Session Initiation Protocol (SIP) may be used for such purposes (see, e.g., IETF request for comment document RFC 3261, entitled: *SIP: Session Initiation Protocol*, July 2002, the contents of which are hereby incorporated by reference in its entirety). SIP was generally developed to allow for initiating a session between two or more endpoints in the Internet by making these endpoints aware of the session semantics. Accordingly, devices (or users that run certain applications on these devices) are registered with the SIP backbone so that an invitation to a particular session can be correctly delivered to these endpoints. To achieve this, SIP provides a registration mechanism for devices and users, and it applies mechanisms such as location servers and registrars to route the session invitations appropriately. Although SIP is primarily a tool for initiating a communication session between endpoints, extensions to SIP have been proposed to provide event registration and trigger notification (see e.g., IETF document RFC 3265, *SIP-Specific Event Notification*, July 2002, the contents of which are hereby incorporated by reference in its entirety). Such a proposal, however, neither specifies the semantics of specific events, nor systems and methods for uploading event information.

The SIP event framework, which would enable event-based information provisioning to any node in the Internet, is supposed to become a key element within the SIP infrastructure. However, the current Internet Engineering Task Force (IETF) standardization process for extensions to the SIP event framework, namely the definition of particular event packages that are required for provisioning of particular information, requires such extensions to run through an extensive process, starting from drafting a proposal to becoming a request for comment (RFC) document. If the usage of the SIP event framework for a large variety of events is envisioned, such a standardization process may soon become a significant bottleneck for the deployment of SIP event-based techniques. Such standardization becomes even more difficult if the usage of SIP events for information provisioning is considered based on some dynamic or ambiguous application semantic. In this regard, the required consensus within the standardization typically heavily delays any deployment of the particular event package. Hence, it seems undesirably difficult to use SIP events for such ambiguous or dynamically determined application semantic.

As a typical scenario, consider the provisioning of location information through SIP events. Apart from bare sensor information, SIP "location" events may be desirable even for derived location information, such as city, county, or state. Further, an application may desire to specify the usage of particular sensors in determining the location information. Hence, it is generally not sufficient to subscribe to some "location" information without having an unambiguous agreement of the semantic of the information that will be provided by the SIP event server.

In another typical scenario, SIP events may be used to provide notifications as to whether or not a particular user is "available," such as may be used in call routing decisions. The semantic of "available," however, is typically dependant upon several factors. The decision whether or not a device or a user is available may consider one or more different inputs, such as schedule and location, schedule only, connectivity of certain devices, presence of other users, current activity, and/or status of particular sensors (e.g., a tilt sensor on the phone may indicate that a mobile station has been placed face down to thereby reject calls). Furthermore, the semantic may also depend upon the current situation of the user. For example, "available" may be differently defined in private situations compared to business situations. Due to the variety of interpretations of the same event, then, it is often desirable to have an unambiguous understanding of the semantic before a subscription before subscribing to a respective event.

As a consequence of the extensive standardization process, current SIP events are merely defined for rather simple, non-ambiguous semantics, such as presence. Any more complex application semantic is assumed to be implemented within the SIP client, such as an end user or application, placing the burden of realizing the application semantic on the client. However, it is desirable to enable more complex application semantics even in SIP event servers, e.g., through the implementation of reasoning functionality and rule-based semantics in order to provide more complex, semantic-rich information through SIP events. Placing such functionality in the SIP event server may be advantageous due to the fact that the SIP event server may have better computational power and memory to implement the functionality. Also, the SIP event server may have better (or even exclusive) access to resources that are required to implement the desired application semantic. In addition, through the consistent re-use of particular semantics, the cost of the entire service may be reduced.

SUMMARY OF THE INVENTION

In light of the foregoing background, embodiments of the present invention provide a system and method for binding a semantic to an event, where the event is at least partially associated with services or content available within a network. Embodiments of the present invention resolve ambiguity of application semantics of events, such as SIP events, by binding a particular semantic to such events. Additionally, embodiments of the present invention support dynamically assigning an event package to a semantic description. Therefore, according to embodiments of the present invention, ambiguous application semantics are supported through events without going through the entire IETF standardization process. This enables the provisioning of semantic-rich information to SIP clients through SIP event servers, which can operate as service providers rather than merely information providers.

According to one aspect of the present invention, a system is provided for binding a semantic to an event. The system includes a first network entity capable of transmitting a subscription message including an event package and a semantic description describing a semantic associated with the event package. For example, the semantic description can include a description for at least a service or a content capable of satisfying at least a portion of the semantic description. The system also includes an event server capable of receiving the subscription message. Upon receipt of the subscription message, the event server may be capable of determining whether the event server supports binding the semantic description to the event package. Thereafter, the event server is capable of generating a semantic package identifier associated with the event package and the semantic description to thereby bind the event package to the semantic description. The event server is further capable of sending a first notify message to the first network entity, where the first notify message includes the semantic package identifier. More particularly, the event server can generate the semantic package identifier and send the first notify message if the event server supports binding the semantic description to the event package.

The subscription message can identify an unassigned event package and include the semantic description describing a semantic. In such instances, the event server can be capable of dynamically assigning an event package to the semantic description before generating the semantic package identifier. Also in such instances, the first notify message further includes the assigned event package. In other instances, the subscription message includes an event package and a uniform resource identifier (URI). In these instances, the system can also include an ontology server capable of communicating with the event server based upon the URI. The ontology server is capable of transmitting, to the event server, at least a portion of the semantic description based upon the event package. The event server can then be capable of generating the semantic package identifier at least partially based upon the portion of the semantic description received from the ontology server.

The first network entity can be further capable of transmitting a subscription message including the semantic package identifier, such as after the first network entity receives the semantic package identifier. The subscription message including the semantic package identifier can further include an expiration time for expiration of the subscription to the event, if so desired. The event server can then be capable of retrieving the event package and the bound semantic description based upon the semantic package identifier. Thereafter, the event server can check for a match for the event package based upon the semantic description. Also, the event server can be capable of sending a second notify message to the first network entity, where the second notify message indicates whether the match was located.

The system can, additionally or alternatively, include at least one resource capable of providing the information capable of satisfying at least a portion of the semantic description. In this regard, the event server can be capable of checking for a match by retrieving information from the resources capable of satisfying the semantic description. More particularly, the event server may be capable of checking for a match by polling the resources. The event server can thereafter receive responses from the resources, where the responses contain an indication of a non-existing match or information at least partially matching the information capable of satisfying at least a portion of the semantic description.

A method and event server for binding a semantic to an event are also provided. Embodiments of the present invention therefore provide binding a semantic to an event package to thereby resolve ambiguity of application semantics of events. Embodiments of the present invention also support dynamically assigning an event package to a semantic description, such as when the subscription message including the semantic description identifies an unassigned event package. According to embodiments of the present invention, ambiguous application semantics are supported through events without going through the entire IETF standardization process. Embodiments of the present invention thus enable the provisioning of semantic-rich information to SIP clients through SIP event servers, thereby expanding the functionality of such SIP event servers. In addition, embodiments of the present invention facilitate uniform semantic descriptions by providing ontology servers from which semantic descriptions can be retrieved based upon event packages, for example. As such, the system and method of embodiments of the present invention solve the problems identified by prior techniques and provide additional advantages.

BRIEF DESCRIPTION OF THE DRAWINGS

Figure 1:
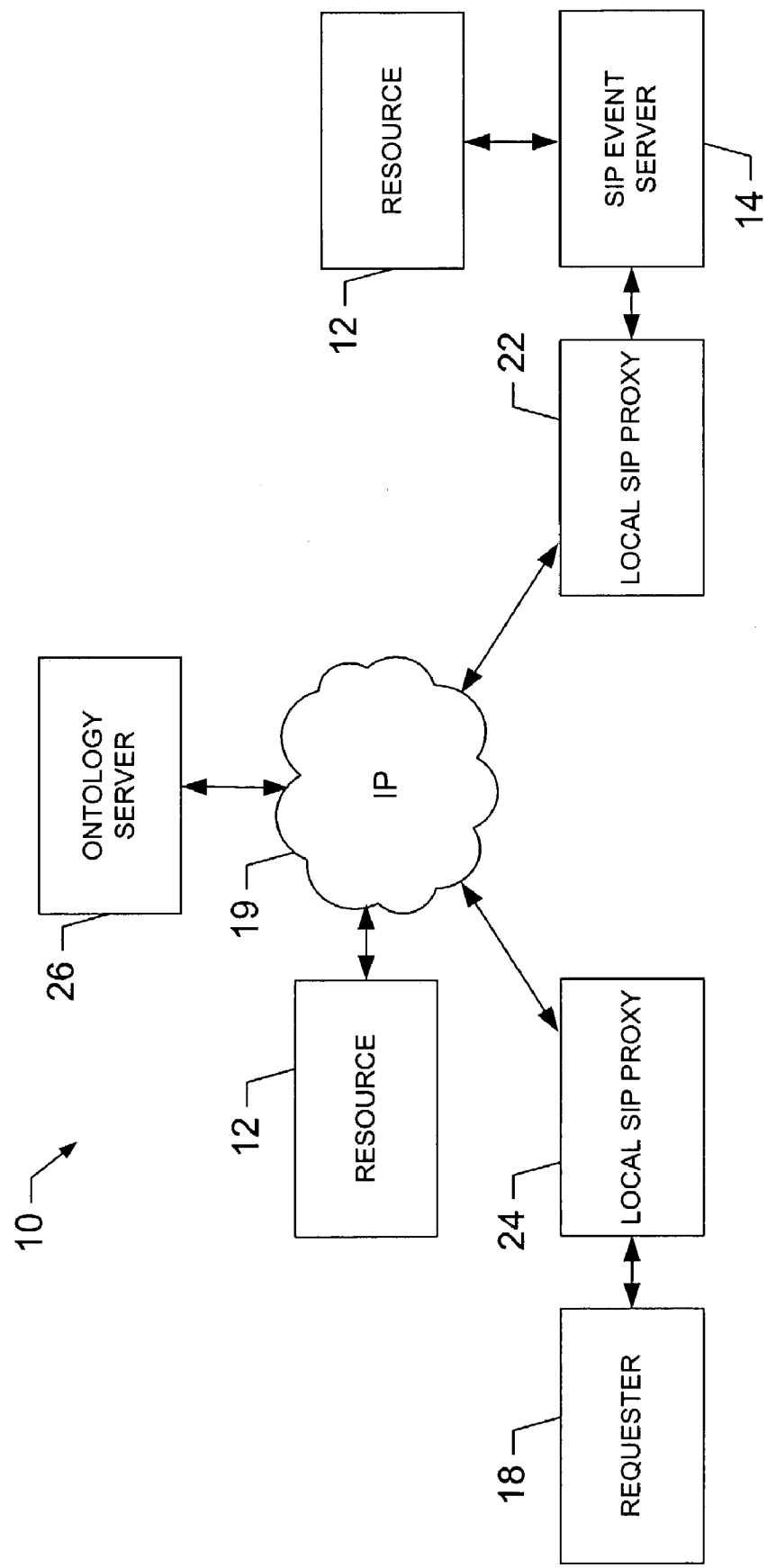
Figure 2:
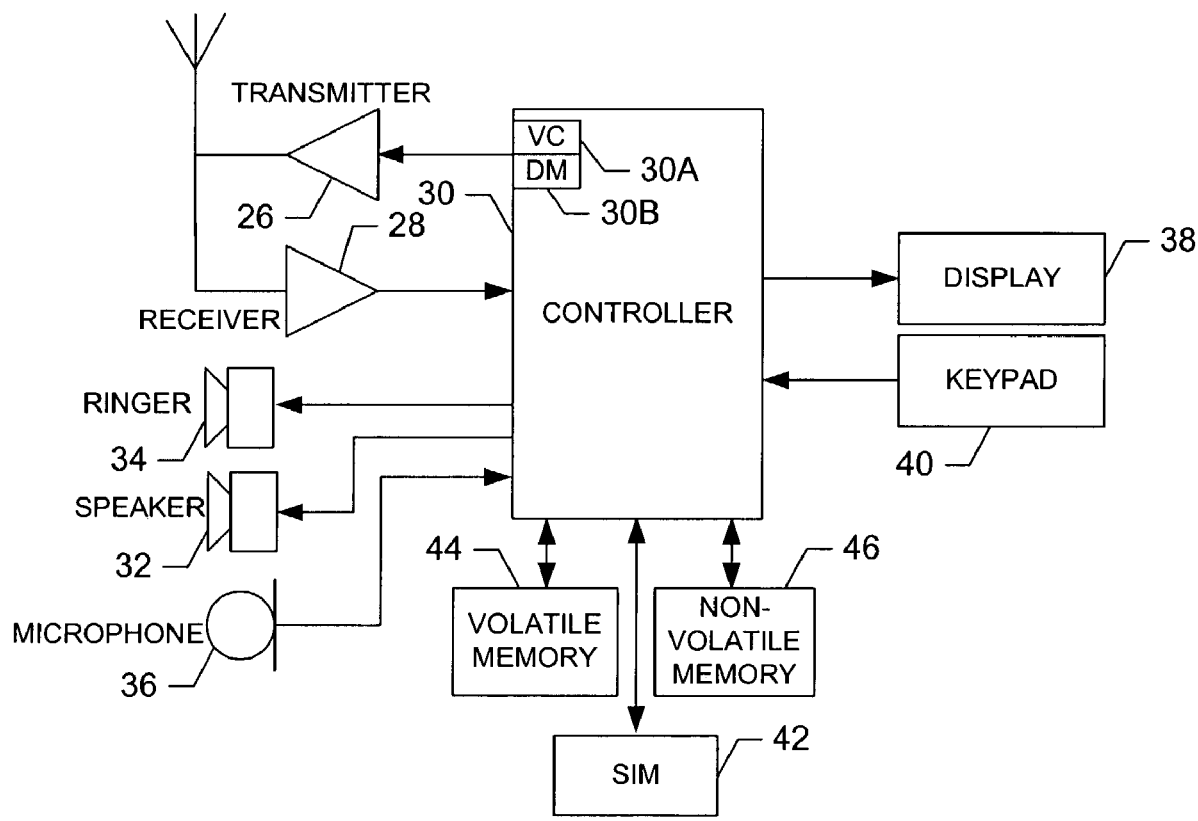
Figure 3:
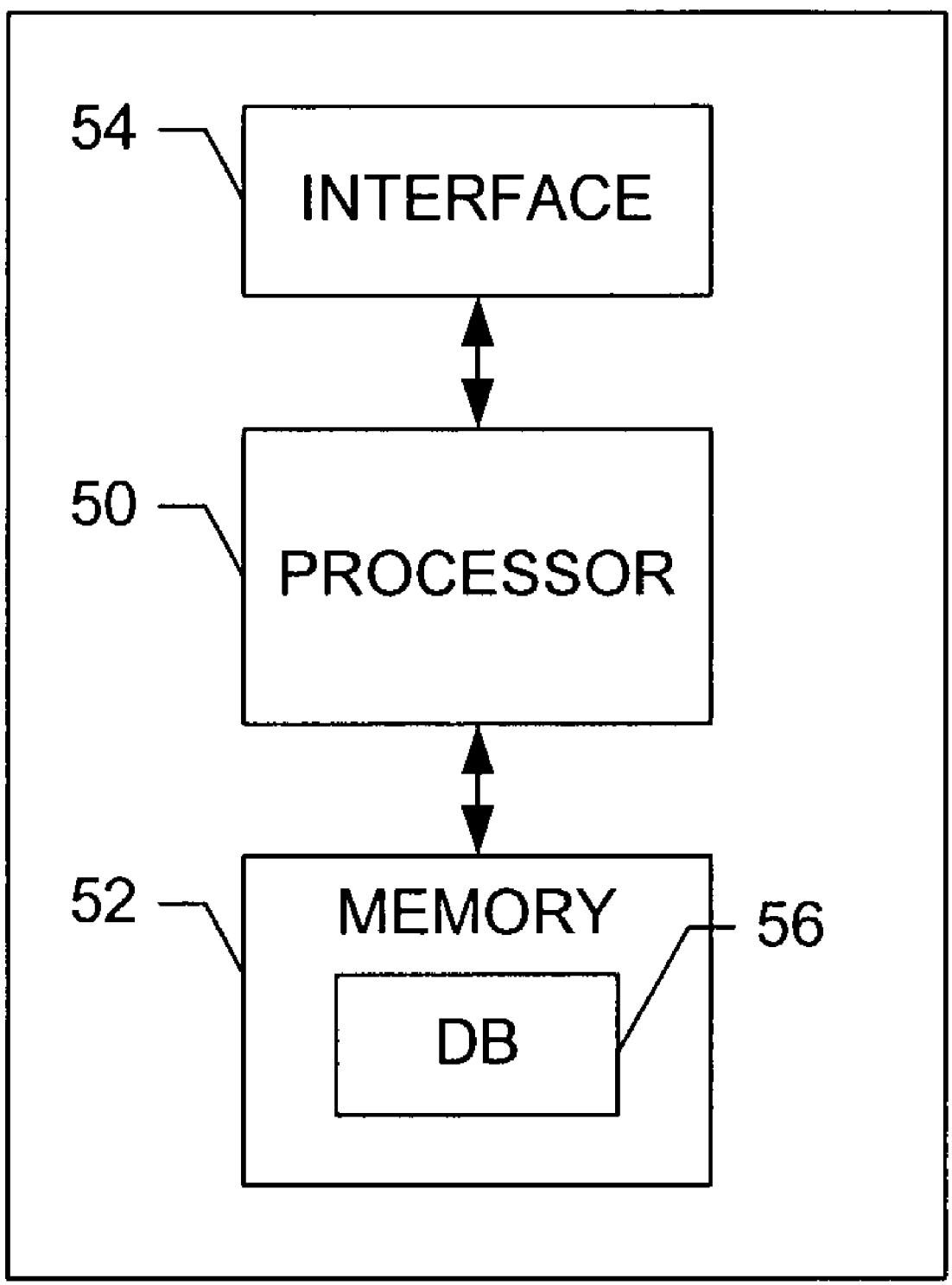
Figure 4:
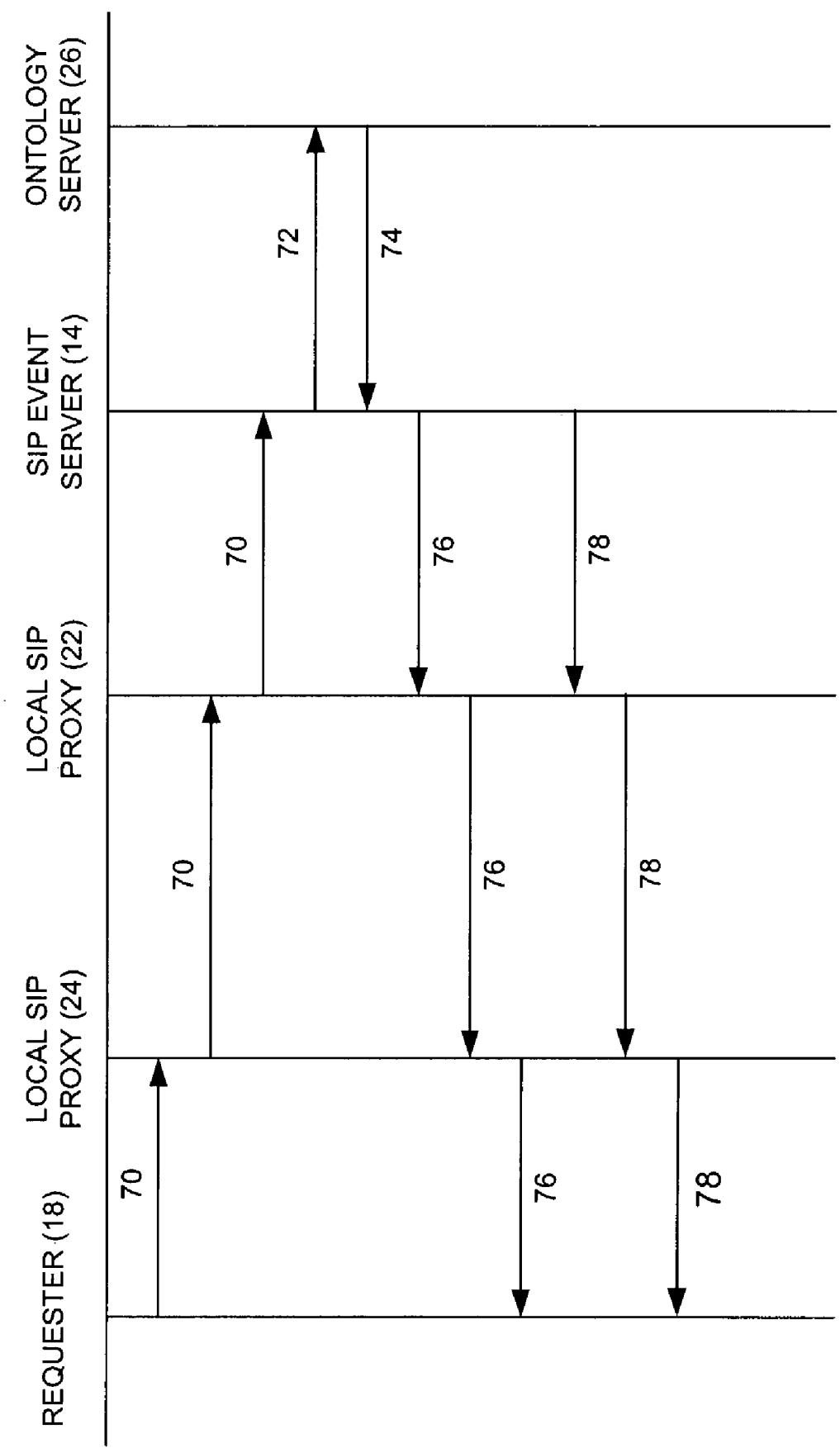
Figure 5:
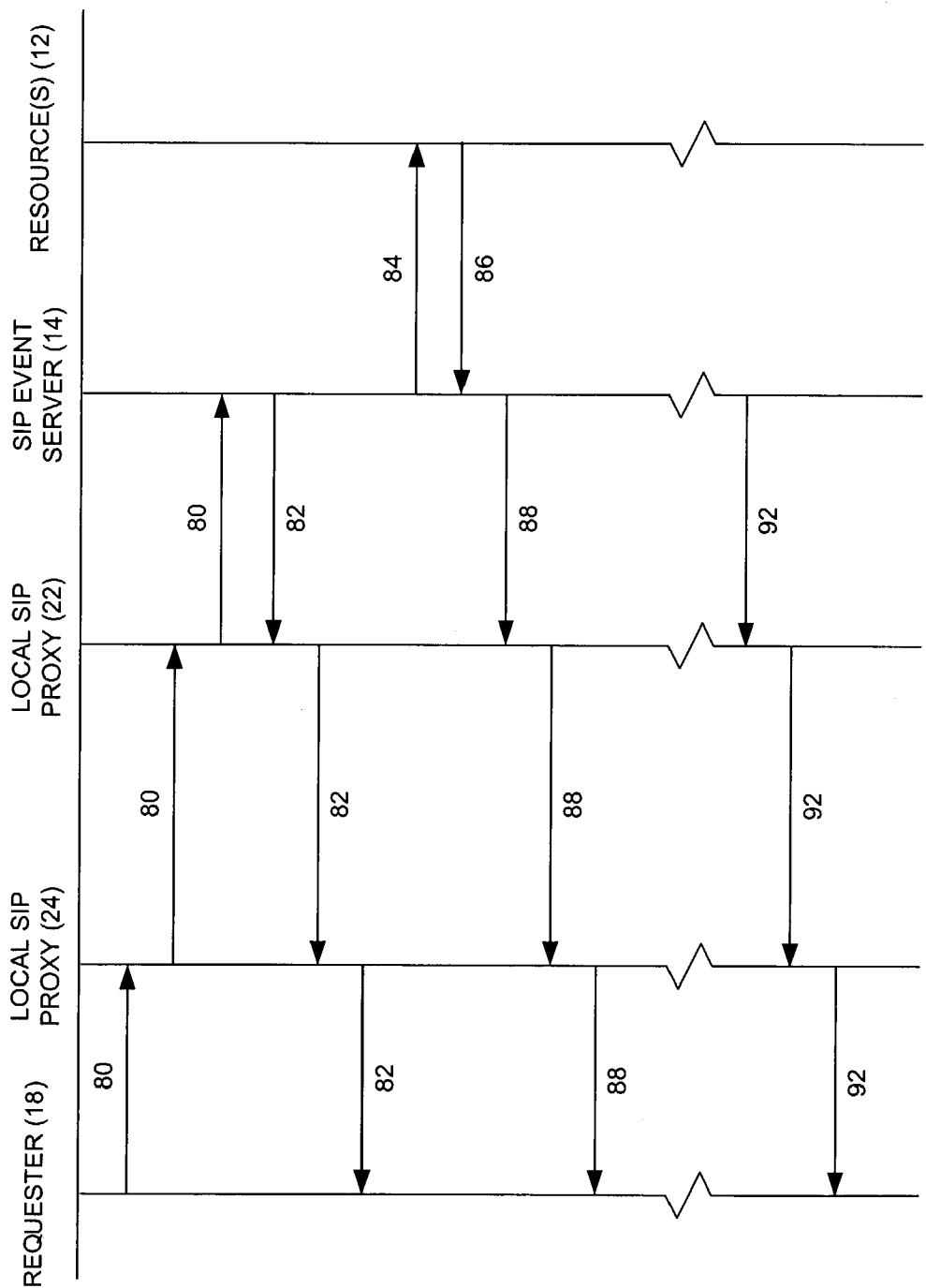

Having thus described the invention in general terms, reference will now be made to the accompanying drawings, which are not necessarily drawn to scale, and wherein:

FIG. 1 shows a system that supports registration, querying, subscription, and notification methods according to one embodiment of the present invention;

FIG. 2 is a schematic block diagram of a mobile station that may act as either a service/content provider, a SIP Event Server, or a requester according to embodiments of the present invention;

FIG. 3 shows a functional diagram of a server, which is representative of a SIP event server, or the local repository/service agent, according to one embodiment of the present invention;

FIG. 4 shows message flows between entities in a method of content or service semantic binding according to one embodiment of the present invention; and FIG. 5 shows message flows between entities in a method of subscription/notification of service and/or content requests according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, a general system 10 is shown that supports content and service registration, query, subscription, and notification in networks. The system generally includes one or more resources 12, two of which is shown, , an SIP event server 14, a requester 18, an ontology server 26, and an IP communications network 19 through which the service/content provider, the SIP event server, the requester and the ontology server communicate.

The resources 12 may comprise any of a number of elements, devices and/or systems capable of providing information. For example, a resource may comprise a processing element, such as a personal computer, laptop computer, server computer or other high level processor, capable of providing information like application information (e.g., software calendar information) and/or state information (e.g., current activity). Also, for example, a resource may comprise a mobile station or other devices, applications or the like capable of providing information. Further, a resource may comprise one or more physical sensors, such as temperature sensors, location sensors (e.g., GPS), humidity sensors, vicinity light sensors, skin conductivity sensors, or the like. As shown, the resources may be in communication with the SIP event server 14 in any of a number of different manners, including directly and/or indirectly (e.g., via the IP communications network 19).

The requester 18 may be any entity, device system or the like that requests service and/or content information related to one or more service/content providers. The SIP event server 14 may comprise any entity, device, system or the like that is capable of storing event package subscriptions, where one or more of the event packages have a semantic description designated by the requester. In this regard, the SIP event sever may be capable of receiving information that satisfies the semantic description, and send the subscribing requester a notification that the semantic has been satisfied.

The ontology server 26 is capable of communicating with the SIP event server 14 to provide all or a portion of the description for a given semantic. In this regard, the ontology server is capable of defining any of a number of different semantics in any of a number of different manners, as such will be appreciated by those skilled in the art. For example, the ontology server may be capable of defining the semantic "available" based upon (a) a schedule from a designated electronic calendar, (b) the location of a mobile station, and (c) current activity of the mobile station. Although, as indicated above and described below, the ontology server communicates with the SIP event server to provide at least a portion of the definition of a desired semantic, the ontology server can alternatively communicate with the requester 18 to provide at least a portion of the definition, if so desired.

Referring now to FIG. 2, a functional diagram of a mobile station is shown that may act as either a resource 12, an SIP Event Server 14, or a requester 18 according to embodiments of the invention. It should be understood, that the mobile station illustrated and hereinafter described is merely illustrative of one type of mobile station that would benefit from the present invention and, therefore, should not be taken to limit the scope of the present invention. While several embodiments of the mobile station are illustrated and will be hereinafter described for purposes of example, other types of mobile stations, such as portable digital assistants (PDAs), pagers, laptop computers and other types of voice and text communications systems, can readily employ the present invention.

The mobile station includes a transmitter 26, a receiver 28, and a controller 30 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first, second and/or third-generation communication protocols or the like. For example, the mobile station may be capable of operating in accordance with second-generation (2G) wireless communication protocols IS-136 (TDMA), GSM, and IS-95 (CDMA). Some narrow-band AMPS (NAMPS), as well as TACS, mobile terminals may also benefit from the teaching of this invention, as should dual or higher mode phones (e.g., digital/analog or TDMA/CDMA/analog phones).

It is understood that the controller 30 includes the circuitry required for implementing the audio and logic functions of the mobile station. For example, the controller may be comprised of a digital signal processor device, a microprocessor device, and various analog to digital converters, digital to analog converters, and other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 30A, and may include an internal data modem (DM) 30B. Further, the controller may include the functionally to operate one or more software programs, which may be stored in memory. For example, the controller may be capable of operating a connectivity program, such as a conventional Web browser. The connectivity program may then allow the mobile station to transmit and receive Web content, such as according to the Wireless Application Protocol (WAP), for example.

The mobile station also comprises a user interface including a conventional earphone or speaker 32, a ringer 34, a microphone 36, a display 38, and a user input interface, all of which are coupled to the controller 30. The user input interface, which allows the mobile station to receive data, can comprise any of a number of devices allowing the mobile station to receive data, such as a keypad 40, a touch display (not shown) or other input device. In embodiments including a keypad, the keypad includes the conventional numeric (0–9) and related keys (#, *), and other keys used for operating the mobile station.

The mobile station can also include memory, such as a subscriber identity module (SIM) 42, a removable user identity module (R-UIM) or the like, which typically stores information elements related to a mobile subscriber. In addition to the SIM, the mobile station can include other memory. In this regard, the mobile station can include volatile memory 44, such as volatile Random Access Memory (RAM) including a cache area for the temporary storage of data. The mobile station can also include other non-volatile memory 46, which can be embedded and/or may be removable. The non-volatile memory can additionally or alternatively comprise an EEPROM, flash memory or the like. The memories can store any of a number of pieces of information, and data, used by the mobile station to implement the functions of the mobile station. For example, the memories can store an identifier, such as an international mobile equipment identification (IMEI) code, capable of uniquely identifying the mobile station, such as to a mobile switching center (MSC). Also, for example, the memories can store instructions for creating messages related to embodiments of the present invention, such as REGISTER, PUBLISH, or SUBSCRIBE messages.

Referring now to FIG. 3, a functional diagram of an entity that may act as a resource 12, an SIP event server 14 or an ontology server 26 is shown. Although shown as separate entities, in some embodiments, a single entity may support a logically separate, but co-located, SIP event server with a respective resource and/or an ontology server. The entity acting as the SIP event server, a resource or an ontology server generally includes a processor 50 connected to a memory 52 and an interface 54. The memory typically includes instructions for the processor to perform steps associated with operating in accordance with embodiments of the present invention. As a resource, the memory may store a local database containing information capable of satisfying a semantic description associated with, or otherwise bound to, an event package, as described below. As an SIP event server, the memory may store a local database containing subscription information for devices or URIs. Also, as an ontology server, the memory may store a local database containing one, or more typically a plurality of, ontologies, as such are known to those skilled in the art.

In accordance with embodiments of the present invention, the system 10 provides a session initiation protocol (SIP) framework. As such, the SIP event server 14 and the requester 18 are each registered with a corresponding local SIP proxy 22 and 24, respectively. Although not shown, it will be appreciated that one or more resources 12 can also be registered with a corresponding local SIP proxy, and thus be part of the SIP framework. Also, although shown as separate logical entities, the SIP event server and/or SIP proxy 22 may be co-located. However, the SIP event server is generally an entity that is logically separate from a SIP proxy 22. Based on the system, methods of service and/or content semantic binding through an SIP event package template, and subsequent subscription and notification relating to the bound event package, according to embodiments of the present invention may be practiced.

Referring now to FIG. 4 in particular, as well as FIGS. 1–3 in general, message flows for a method of associating, linking or otherwise binding a particular semantic (e.g., "available") with an event package, according to one embodiment of the present invention, are shown. According to the method, the requester 18 may bind a particular semantic with an event package such that the requester can subsequently subscribe to notifications for particular events based upon the particular semantic. As such, the requester can receive notifications related to subscribed-to events at periodic intervals, such as at pre-defined intervals or when the status changes for subscribed-to events. For instance, returning to the mobile telephone scenario, suppose that the requester is the mobile station of a second user. Suppose also that the mobile station of the second user maintains a "buddy" list that indicates the availability of a list of users, including the first user. Further, suppose that the second user desires to define the availability of the users on the buddy list based upon (a) schedules from electronic calendars maintained by the mobile stations of the listed users, (b) the location of the mobile stations of the listed users, and (c) the current activity of the mobile stations of the listed users.

In order to receive notifications as to the "availability" of the users on the buddy list, the second user may subscribe to the SIP event server 14 for notifications of a content event for the availability of the listed users. Accordingly, when registering with the network including the SIP event server, the mobile station obtains the address of the SIP event server. In particular, the SIP event server may communicate with resources 12 capable of providing information that may satisfy all, or a portion of, the description of the semantic "available" (i.e., the electronic calendars, locations and current activity of the mobile stations). In order to associate, link or otherwise bind a particular semantic (e.g., "available") with an event package identifying the availability of the users on the buddy list, the mobile station sends a SUBSCRIBE message 70 to its corresponding local SIP proxy 24.

The SUBSCRIBE message is typically identified by the name of the event package and sent with a template, such as may be identified by the notation "bind" to identify the desired binding of the semantic with the event package, as defined in, for example, IETF request for comment document RFC 3265, entitled: *SIP-Specific Event Notification*, July 2002. For example, the SUBSCRIBE message may be sent as "available.bind." As will be appreciated, in some instances, the event package may not have an assigned name. In such instances, a name can be dynamically assigned to the event package, such as by the SIP event server. To identify the request for an otherwise unnamed event package, the SUBSCRIBE message may be sent with the event package identified as "generic." For example, the SUBSCRIBE message may be sent as "generic.bind."

The SUBSCRIBE message typically contains as a payload the description of the semantic to be bound to the event package. In addition to, or in lieu of, including the description of the semantic, the payload may include the a uniform resource identifier (URI) of an ontology server 26 from which all or a portion of the semantic description may be retrieved. The SUBSCRIBE message 70 according to this embodiment may be a message that is part of an extension to SIP as defined in IETF's request for comment document RFC 3265, entitled: *SIP-Specific Event Notification*, dated June 2002, the contents of which are hereby incorporated by reference in its entirety. The format of the semantic description in the payload may include, for example, attribute-based formats such as used in SLP or RDF-based formats or a dedicated format for SIP service description.

The SUBSCRIBE message is appropriately forwarded to the SIP event server 14 via proxies 24 and 22. Upon reception of the SUBSCRIBE message, in instances in which the SUBSCRIBE message includes the description of the semantic, the SIP event server extracts the description of the semantic from the SUBSCRIBE message. Additionally, or alternatively, if the SUBSCRIBE message includes the URI of an ontology server 26, the SIP event server can communicate with the ontology server via message 72, such as according to an indirection technique, to retrieve, via message 74, a description of at least a portion of the semantic based upon the semantic name. For more information on such a method of retrieving the description from the ontology server, see *Requirements for Content Indirection in Session Initiation Protocol (SIP) Messages*, draft-ietf-sipping-content-indirect-03, IETF draft Feb. 27, 2003, the contents of which are hereby incorporated by reference in its entirety.

Once the SIP event server 14 has extracted and/or received the description of the semantic, the SIP event server determines whether the SIP event server supports binding the particular semantic to the event package, such as by supporting the application binding operation, including support for sufficient resources 12 capable of providing the information required to determine whether the conditions of the semantic are met (e.g., supporting the resources capable of providing information from the electronic calendars of the users on the first user's buddy list). Additionally, or alternatively, for example, the SIP event server can determine whether the SIP event server supports binding the semantic by including sufficient input in the description of the semantic. After determining whether the SIP event server supports binding the semantic to the event package, the SIP event server appropriately confirms receipt of the SUBSCRIBE message with message 76, such as a '200OK' message, sent to the requester via proxies 22 and 24. Alternatively, if the SIP event server does not support binding the semantic to the event package, the SIP event server may send message 76 to the requester via proxies 22 and 24, where the message indicates failure to bind the semantic to the event package.

After confirming receipt of the SUBSCRIBE message 70, the SIP event server 14 generates and stores, such as in a lookup table in the local database 56 stored in memory 52 (see FIG. 3), a semantic package identifier that links the requester 18 and any subsequent subscription to the bound event package and semantic (including semantic description). If the event package did not include an assigned name, the SIP event server may also assign a name to the event package. The SIP event server can assign any of a number of different names to identify the event package with the bound semantic, such as by assigning the semantic package identifier as the name of the event package. Alternatively, the name of the event package may be designated in the SUBSCRIBE message 70 sent by the requester. The SIP event server can then send a NOTIFY message 78 back to the requester via proxies 22 and 24. This message contains the semantic package identifier that, upon subsequent subscription of the requester with the event package, allows the SIP event server to relate the subscribed event package to the bound semantic. Additionally, if the SIP event server assigned a name to the event package, the NOTIFY message may also include the assigned name. The NOTIFY message is appropriately routed through the SIP proxies 22, 24 to the requester. Upon reception of the NOTIFY message, the requester extracts the received semantic package identifier (and assigned name, if so assigned) for further use to subscribe to the event package with the bound semantic.

Once the desired semantic has been bound to the event package, and the requester 18 has received the semantic package identifier, the requester can subscribe to the event package now associated, linked or otherwise bound to the desired semantic, such as according to the method now described with reference to FIG. 5. To subscribe to the bound event package according to one embodiment of the present invention, the requester sends a SUBSCRIBE message 80 to local SIP proxy 24. The SUBSCRIBE message contains as a payload the semantic package identifier that identifies the event package bound to the semantic description, and includes a type of event of interest (e.g., available) plus any additional information that may be required according to the previously agreed semantic description (see FIG. 4). The SUBSCRIBE message may also contain an "expires" parameter (not shown) indicating duration of the subscription. Depending on the length of the subscription, the requester may receive periodic notifications in response to changes for the event or may receive a one-time notification, for example, of available buddies on his buddy list, including the second user.

As before, the SUBSCRIBE message 80 may be a message that is part of an extension to SIP as defined in IETF's RFC 3265 entitled "*SIP-Specific Event Notification*," dated June 2002. Also, as before, the SUBSCRIBE message is appropriately forwarded to the SIP event server 14 via proxies 24 and 22. Upon reception of the SUBSCRIBE message, the SIP event server extracts the semantic package identifier, that identifies the event package and the semantic description. The SIP event server can then retrieve, such as from the lookup table in the local database 56 stored in memory 52 (see FIG. 3), the stored event package, including the semantic description, based upon the semantic package identifier. Thereafter, the SIP event server can store the subscription for the event package in the local database 56 stored in memory 52 (shown in FIG. 3). The associated description of the event package, including the semantic description, and the expiration time for the subscription are also stored in the local database. Additionally, or alternatively, the SIP event server can store the semantic package identifier in the subscription such that the description of the event package and associated semantic description can be retrieved from the lookup table as needed.

Upon reception of SUBSCRIBE message 80, the SIP event server 14 appropriately confirms reception with a '200 OK' message 82 sent to the requester via proxies 22 and 24. The SIP event server can thereafter retrieve the appropriate information regarding one or more of the resources 12 capable of providing information that satisfy the semantic. The SIP event server can retrieve the information in any number of different manners. According to one embodiment, for example, the SIP event server may retrieve the required information through messages 84, such as by polling the resources. As will be appreciated, the SIP event server can communicate with the resources in any of a number of different known manners, generally depending upon the type of resource. If several resources have been polled for information capable of satisfying the semantic, the SIP event server 14 typically waits for responses, via response messages 86, from all these resources. According to another embodiment, the SIP event server can check internally stored information regarding the one or more resources to retrieve the required information that satisfies the semantic.

Once the SIP event server 14 has retrieved the required information necessary to satisfy the semantics, the SIP event server 14 sends a NOTIFY message 88 back to the requester 18 via proxies 22 and 24. This message contains, for example, a description of the devices, entities, or the like satisfying the semantic (e.g., users on the buddy list considered "available"). Additionally, or alternatively, the NOTIFY message may contain the triggered event in an appropriate format. It may further contain one or more contact URI(s) provided in the service registration(s) of the resource(s), such as resource 12, that provided the information satisfying the description of the semantic. If there has been no match for the semantic description, the payload contains an appropriate indication. Upon reception of the NOTIFY message, the requester, or more particularly a respective application (not shown) on the requester, may extract, for example, the list of users considered "available." The requester may additionally, or alternatively, extract the received information satisfying the semantic and the contact URI for further use, if available. For instance, the requester may subsequently contact one of the devices, entities or the like satisfying the semantic (e.g., mobile station of the second user) using a SIP INVITE message (not shown).

It will be appreciated that one embodiment of the present invention allows for a one-time subscription scheme, which may be referred to as a QUERY. For a QUERY, the requester 18 sends a SUBSCRIBE message 80, such as in a manner description above, in which an expiration time of zero is specified for the subscription. In such an instance, the subscription is not stored in the local database of the SIP event server 14. Thus, only the semantic package identifier lookup, local to the SIP event server, and the necessary information retrieval according to the semantic, is performed, leading to an appropriate NOTIFY message 88 that is sent to the requester.

If the subscription in message 80 has not been a one-shot subscription, i.e., a non-zero expiration time has been given in message 80, the SIP event server 14 has to perform appropriate functions upon reception of information from the resources 12 that may alter the agreed semantic, such as by changing the status of "available" to "non-available". Hence, the SIP event server can periodically receive information from the resources, and/or receive information from the resources when the respective information has been added, deleted or otherwise modified. The SIP event server can then compare the semantic description with the information capable of satisfying the semantic, including the added, deleted or otherwise modified information. Thereafter, the SIP event server can generate appropriate NOTIFY messages 92 that are sent to subscribed requesters 18. These messages are appropriately routed through the SIP proxies 22, 24 to the requester, therefore notifying the requester of devices, entities, or the like that satisfy the semantic, or alternatively, that no longer satisfy the semantic.

As will be appreciated, the present invention is fully applicable to a wide range of services and content, as well as to other types of discoverable information. As an additional example, suppose the SIP event server 14 serves a network for a large shopping mall. Suppose many of the stores and merchants associated with the mall maintain various resources 12. For instance, movie theaters may maintain servers that provide content related to movie schedules, prices, movie trailers, etc. In addition, retail stores may maintain servers that provide content related to store specials, coupons, etc. Each of these resources may provide information capable of satisfying a given semantic. Many of these entities may also subscribe to events having a particular semantic with the SIP event server 14. For example, a shopper's mobile telephone may subscribe with the SIP event server to thereby receive notifications when one or more merchants offer a sale. Under such a scenario, a user of a mobile station (requester 18) may request such notifications with a particular semantic to describe what the user of the mobile station considers a "sale."

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of binding a semantic to an event maintained by an event server, the event at least partially associated with at least one of services and content available within a network, the method comprising:

receiving, at the event server from a first network entity, a subscription message including an event package and a semantic description describing a semantic associated with the event package;

generating a semantic package identifier associated with the event package and the semantic description to thereby bind the event package to the semantic description; and sending a first notify message to the first network entity, wherein the first notify message includes the semantic package identifier.

2. A method according to claim 1 further comprising determining whether the event server supports binding the semantic description to the event package before generating the semantic package identifier, wherein generating the semantic package identifier and sending the first notify message comprise generating the semantic package identifier and sending the first notify message if the event server supports binding the semantic to the event package.

3. A method according to claim 1, wherein receiving a subscription message comprises receiving a subscription message identifying an unassigned event package and including a semantic description describing a semantic, wherein the method further comprises:

dynamically assigning an event package to the semantic description before generating the semantic package identifier, wherein sending a first notify message comprises sending a first notify message further including the assigned event package.

4. A method according to claim 1, wherein receiving a subscription message comprises receiving a subscription message including an event package and a uniform resource identifier (URI) to an ontology server, wherein the method further comprises:

retrieving at least a portion of the semantic description from the ontology server based upon the event package, and wherein retrieving at least a portion of the semantic description occurs before generating the semantic package identifier.

5. A method according to claim 1 further comprising:

transmitting, from the first network entity to the event server, a subscription message including the semantic package identifier;

retrieving the event package and bound semantic description based upon the semantic package identifier;

checking for a match for the event package based upon the semantic description; and sending a second notify message to the first network entity, wherein the second notify message indicates whether the match was located.

6. A method according to claim 5, wherein the semantic description includes a description of information capable of satisfying at least a portion of the semantic description, wherein checking for a match comprises:

retrieving information of at least one resource capable of satisfying at least a portion of the semantic description.

7. A method according to claim 6, wherein retrieving information of at least one resource comprises:

polling at least one resource capable of satisfying at least a portion of the semantic description; and receiving responses from the resources, wherein the responses are generated in response to the resources checking for a match, and wherein the responses contain one of an indication of a non-existing match and information at least partially matching the information capable of satisfying at least a portion of the semantic description.

8. A system for binding a semantic to an event, the event at least partially associated with at least one of services and content available within a network, the system comprising:

a first network entity capable of transmitting a subscription message including an event package and a semantic description describing a semantic associated with the event package; and an event server capable of receiving the subscription message, and thereafter generating a semantic package identifier associated with the event package and the semantic description to thereby bind the event package to the semantic description, wherein the event server is also capable of sending a first notify message to the first network entity, and wherein the first notify message includes the semantic package identifier.

9. A system according to claim 8, wherein the event server is further capable of determining whether the event server supports binding the semantic description to the event package before generating the semantic package identifier, and wherein the event server is capable of generating the semantic package identifier and sending the first notify message if the event server supports binding the semantic to the event package.

10. A system according to claim 8, wherein the subscription message identifies an unassigned event package and includes the semantic description describing a semantic, wherein the event server is capable of dynamically assigning an event package to the semantic description before generating the semantic package identifier, and wherein the first notify message further includes the assigned event package.

11. A system according to claim 8, wherein the subscription message includes an event package and a uniform resource identifier (URI), wherein the system further comprises:
an ontology server capable of communicating with the event server based upon the URI, wherein the ontology server is capable of transmitting, to the event server, at least a portion of the semantic description based upon the event package, and wherein the event server is capable of generating the semantic package identifier at least partially based upon the portion of the semantic description received from the ontology server.

12. A system according to claim 8, wherein the first network entity is further capable of transmitting a subscription message including the semantic package identifier, wherein the event server is capable of retrieving the event package and the bound semantic description based upon the semantic package identifier, and thereafter checking for a match for the event package based upon the semantic description, wherein the event server is also capable of sending a second notify message to the first network entity, and wherein the second notify message indicates whether the match was located.

13. A system according to claim 12, wherein event server is capable of checking for a match by retrieving information of at least one resource capable of satisfying at least a portion of the semantic description.

14. A system according to claim 13, wherein the semantic description includes a description of information capable of satisfying at least a portion of the semantic description, wherein the system further comprises:
at least one resource capable of providing the information capable of satisfying at least a portion of the semantic description, wherein the event server is capable of retrieving the information by polling the at least one resource, and thereafter receiving at least one response containing one of an indication of a non-existing match and information at least partially matching the information capable of satisfying at least a portion of the semantic description.

15. An event server capable of binding a semantic to an event, the event at least partially associated with at least one of services and content available within a network, the event server comprising:

a processor capable of receiving, from a first network entity, a subscription message including an event package and a semantic description describing a semantic associated with the event package, wherein the processor is also capable of generating a semantic package identifier associated with the event package and the semantic description to thereby bind the event package to the semantic description, and thereafter sending a first notify message to the first network entity, and wherein the first notify message includes the semantic package identifier.

16. An event server according to claim 15, wherein the processor is further capable of determining whether the event server supports binding the semantic description to the event package before generating the semantic package identifier, and wherein the processor is capable of generating the semantic package identifier and sending the first notify message if the event server supports binding the semantic to the event package.

17. An event server according to claim 15, wherein the subscription message identifying an unassigned event package and including a semantic description describing a semantic, and wherein the processor is capable of dynamically assigning an event package to the semantic description before generating the semantic package identifier.

18. An event server according to claim 15, wherein the subscription message includes an event package and a uniform resource identifier (URI) of an ontology server, wherein the processor is further capable of retrieving, from the ontology server, at least a portion of the semantic description based upon the event package, and wherein the processor is capable of generating the semantic package identifier at least partially based upon the portion of the semantic description received from the ontology server.

19. An event server according to claim 15, wherein the processor is capable of receiving, from the first network entity, a subscription message including the semantic package identifier, wherein the processor is capable of retrieving the event package and bound semantic description based upon the semantic package identifier, and thereafter checking for a match for the event package based upon the semantic description, wherein the processor is also capable of sending a second notify message to the first network entity, and wherein the second notify message indicates whether the match was located.

20. An event server according to claim 15, wherein the processor is capable of checking for a match by retrieving information of at least one resource capable of satisfying at least a portion of the semantic description.

21. An event server according to claim 17, wherein the event package description includes a description information capable of satisfying at least a portion of the semantic description, wherein the processor is capable of retrieving information by:
polling at least one resource capable of providing the information capable of satisfying at least a portion of the semantic description; and
receiving responses from the resources, wherein the responses are generated in response to the resources checking for a match, and wherein the discovery responses contain one of an indication of a non-existing match and information at least partially matching the information capable of satisfying at least a portion of the semantic description.

* * * * *